(12) United States Patent
Lyons et al.

(10) Patent No.: US 11,794,125 B2
(45) Date of Patent: Oct. 24, 2023

(54) HANDHELD ILLUSION DEVICE

(71) Applicants: Joya Lashan Lyons, Huntersville, NC (US); Andrew David Lyons, II, Huntersville, NC (US)

(72) Inventors: Joya Lashan Lyons, Huntersville, NC (US); Andrew David Lyons, II, Huntersville, NC (US)

( * ) Notice: Subject to any disclaimer, the term of this patent is extended or adjusted under 35 U.S.C. 154(b) by 483 days.

(21) Appl. No.: 17/127,224

(22) Filed: Dec. 18, 2020

(65) Prior Publication Data

US 2022/0193572 A1 Jun. 23, 2022

(51) Int. Cl.
*A63G 21/00* (2006.01)
*A63J 21/00* (2006.01)
*A61C 19/00* (2006.01)

(52) U.S. Cl.
CPC ............. *A63J 21/00* (2013.01); *A61C 19/008* (2013.01)

(58) Field of Classification Search
CPC ... A63G 5/00; A63G 5/02; A63G 5/12; A63G 21/00; A61C 19/008
USPC ......................................... 472/71–73, 81–83
See application file for complete search history.

(56) References Cited

U.S. PATENT DOCUMENTS

| | | | | |
|---|---|---|---|---|
| 1,762,501 | A * | 6/1930 | Brehmer | A63J 21/00 273/153 R |
| 4,026,066 | A * | 5/1977 | Reiner | A63H 33/22 446/236 |
| 6,749,519 | B1 * | 6/2004 | Hasseler | A63J 21/00 472/71 |
| 7,649,519 | B2 * | 1/2010 | Seo | G09G 3/3688 327/108 |
| 2019/0328165 | A1 * | 10/2019 | Cirri | A63J 21/00 |

* cited by examiner

*Primary Examiner* — Kien T Nguyen
(74) *Attorney, Agent, or Firm* — Fraline Allgaier

(57) ABSTRACT

An improved device having a size suitable for handheld use and being used for providing the illusion that a first object has disappeared from view. The first pouch being provided on a first side of a rotatable floor by the timed rotation of the rotatable floor to a second side. The rotatable floor revealing a second object in a second pouch that is provided thereon. The device being operable by a control unit including a microprocessor in communication with a timer mechanism for the motorized rotational movement of the rotatable floor. A display screen having a user interface is used to select the timer parameters for the first and second rotation of the rotational floor.

8 Claims, 13 Drawing Sheets

HANDHELD ILLUSION DEVICE

FIELD OF THE INVENTION

The present invention refers to an improved handheld illusion device for receiving a first object and shielding from view a second object that is revealed with the timed rotation of a rotatable floor. At least one amusement object is used to support the illusion that the first object will disappear and will be magically replaced with a second object. A display screen having a user interface is utilized to select the timer parameters for the sequential movement of the rotational floor and to facilitate the disappearance of the object.

BACKGROUND OF THE INVENTION

A large number of devices, kits, or objects have been provided for creating the illusion that a treasured object has disappeared from a first location and has been replaced by a second object. The illusion is typically played out to a child audience where a child is invited to believe objects will disappear or reappear as provided by a specific design. In a more intimate setting, a child can me made to believe that a fictional character will visit the location with presents or treats.

Most of these devices provide for false bottoms, false flooring, extended exterior walls, or partitions being provided on the surface of the device. For example, U.S. Pat. No. 1,762,501 to Brewer provides for a magic card box that secretly exchanges one card for another. The card magically appears in a box that was previously shown to be empty. The partitions provide the illusion that the bottom portion of the box is unitary and secured.

U.S. Pat. No. 7,649,519 provides for an automatically hidden compartment apparatus and method for creating the illusion that an object inside a chamber has disappeared. The simultaneous closure of a first and a second chamber locks objects from view and prevents a first chamber from opening. The opening of the second chamber creates the illusion that the objects provided in the first chamber have disappeared.

Typically, prior art devices have required the user to remove parts of a device in order to carry out the illusion or trick. In the case of children who might be fascinated with fairytales and the world of make-believe, parents might require a device that is easy to operate and provide a convenient mechanism to enact a fable. For example, if a child has lost a tooth and a parent attempts to enact the story of the tooth fairy, the child might be hesitant or distracted from any pain or soreness that is experienced from the loss of a tooth.

It is believed, that none of the devices provided in the prior art support the realism of a fable or enhance the illusion of a disappearing object. Such devices should be easy to use and effective in retaining a user's attention. In most cases, the end users are parents and children. To this end, the invention as provided herein relates to an improved device having a size suitable for handheld use. The device provides the illusion that an object has disappeared from a first pouch that is provided on the first side of a rotatable floor. The timed rotation of the rotatable floor to a second side reveals a second object in a second pouch of identical construction.

The device is further characterized with the following novel features: (1) A display screen having a user interface providing timer selection parameters to facilitate the use of the device as prescribed herein; (2) One or more custom-programmed software and databases being configured to be executed by a microprocessor for providing a first resting stage of the rotatable floor, actuating a motor driver, generating and storing timer selection parameters, communicating with the user interface, and providing a plurality of timer selection parameters; (3) Timer selection parameters including at least one timer selection parameter being programmed to produce a first 180 degree rotation of the rotatable floor and at least one timer selection parameter being programed to produce a second subsequent 180 degree rotation of said rotatable floor once the motor driver is actuated.

BRIEF SUMMARY OF THE INVENTION

It is an advantage of the present invention to provide an improved handheld illusion device having a size suitable for handheld use and for providing the illusion that a first object has disappeared from a first pouch that is provided on the first side of a rotatable floor. The object disappearing by the timed rotation of the rotatable floor to a second side. At least one amusement object for use in supporting the illusion that said first object will disappear from said first pouch is provided as described herein.

It is an additional advantage of the present invention to provide an improved device having a first pouch and a second pouch being removably attached to a first side and a second side of a rotatable floor respectively and being provided with at least one opening thereon for inserting a first object and a second object therein.

It is an additional advantage of the present invention to provide an improved device wherein the interior housing accommodates a control unit including a microprocessor and a timer mechanism of standard construction. The timer mechanism being in communication with said microprocessor to facilitate the movement of the rotatable floor.

It is still an additional advantage of the present invention to provide a rotatable floor being of substantially rectangular configuration and having side walls for coupling with a first attachment post and a second attachment post. The second attachment post being rotatably attached to the rotatable gear of a stepper motor.

It is an additional advantage of the present invention to provide a display screen having a user interface providing timer selection parameters to facilitate communication with the device and the series of rotation of a rotatable floor.

It is still an additional advantage of the present invention to provide one or more custom-programmed software and databases being configured to be executed by a microprocessor to provide a first resting stage of a rotatable floor, actuate a motor driver, generate and store timer selection parameters, communicate with the user interface, and provide a plurality of said timer selection parameters. The timer selection parameters including at least one timer selection parameter being programmed to produce a first 180 degree rotation of a rotatable floor and at least one timer selection parameter being programed to produce a second subsequent 180 degree rotation of a rotatable floor once a motor driver is actuated.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE SEVERAL VIEWS OF THE DRAWINGS

The present embodiments are illustrated by way of the figures of the accompanying drawings, which may not necessarily be to scale, in which like references indicate similar elements, and in which.

DETAILED DESCRIPTION OF THE INVENTION

An exemplary application of the present invention is described as follows. All illustrations of the drawings are for the purpose of describing selected versions of the present invention and are not intended to be limiting in scope. It will be apparent to a person having ordinary skill in the art that the invention as presented is useable with or without some of the various parts described.

Figure 1:
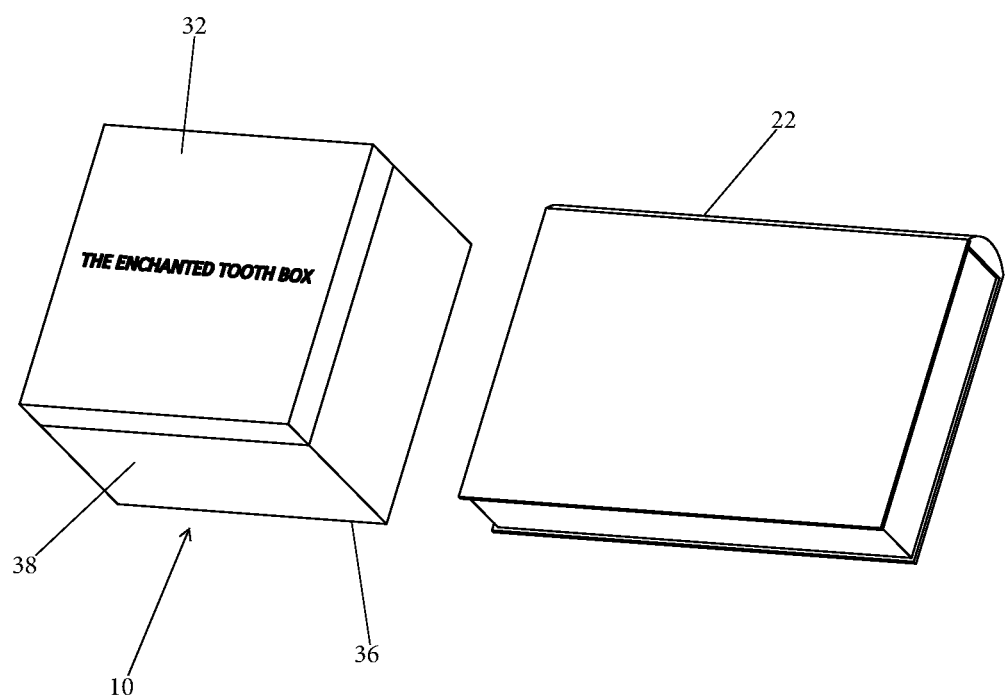
FIGS. 1 and 2 illustrate an exemplary view of the device with an amusement object to support the illusion of a disappearing object in accordance with the preferred embodiments of the present invention.
Figure 2:
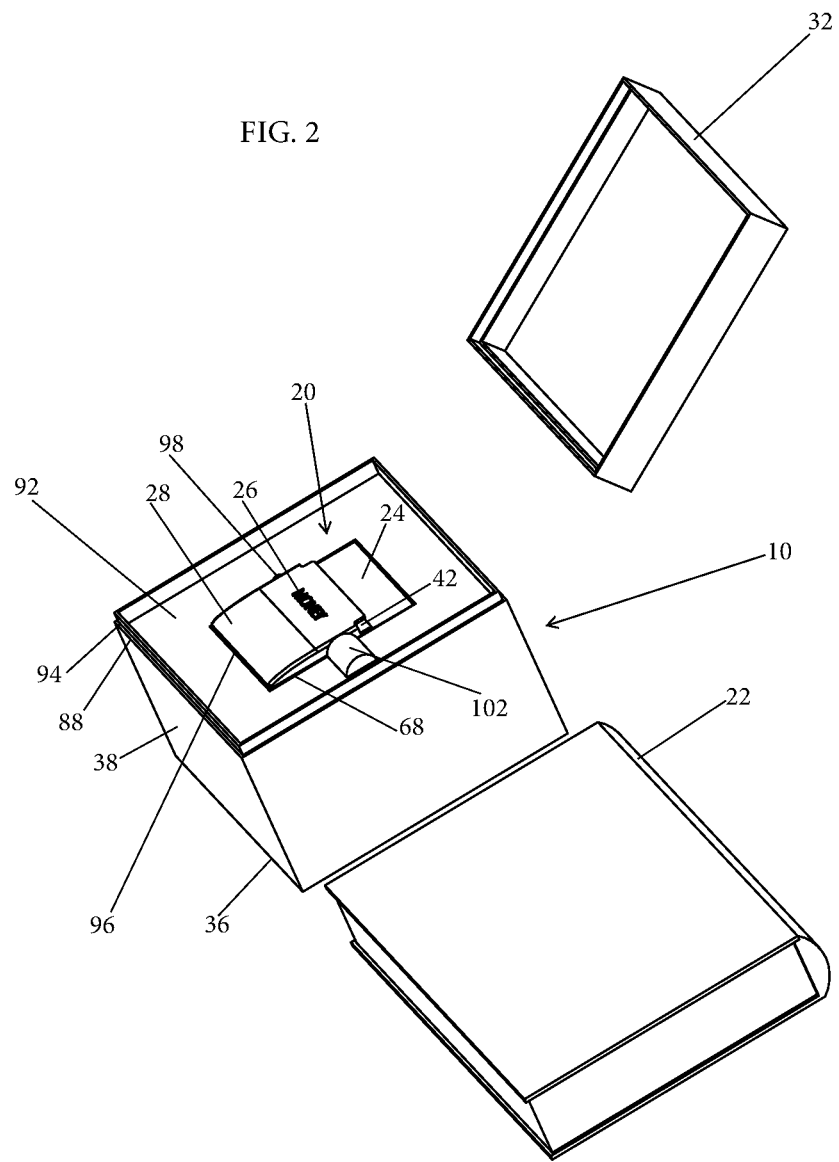
Figure 3:
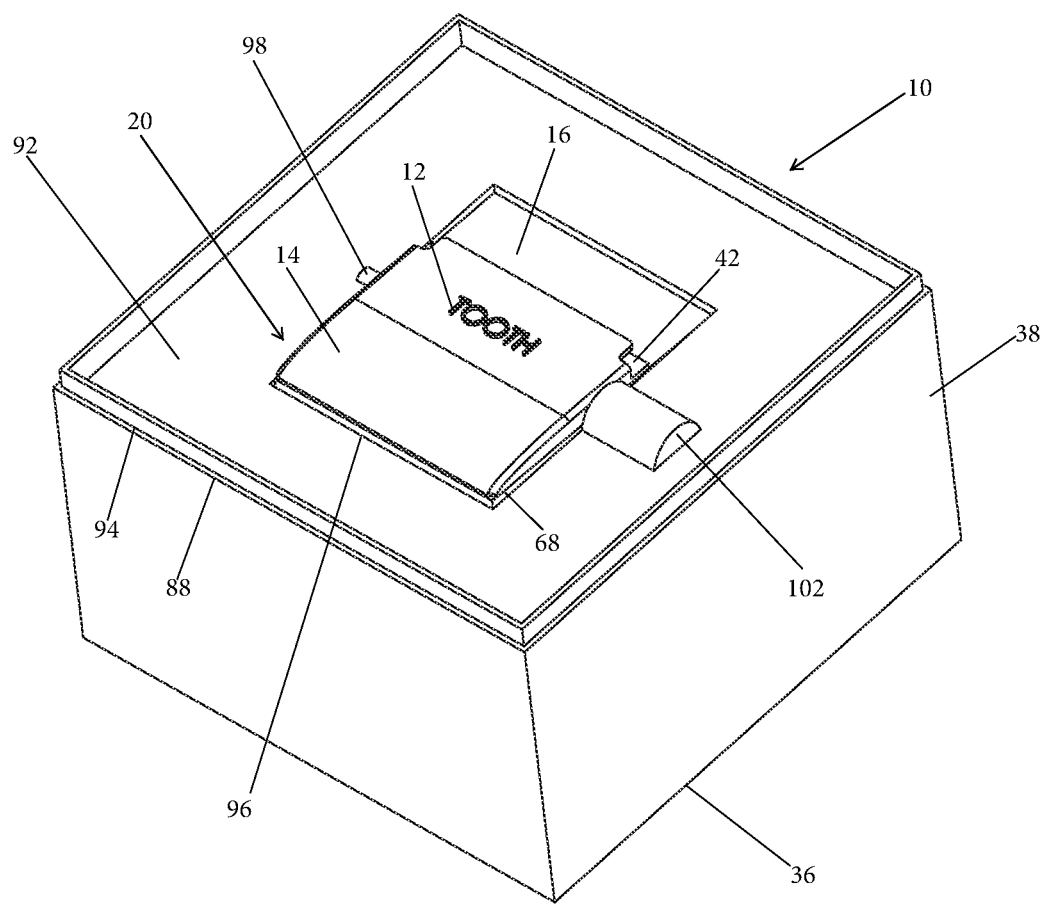
FIG. 3 illustrates an exploded view of the device showing a first side of the rotatable floor.
Figure 4:
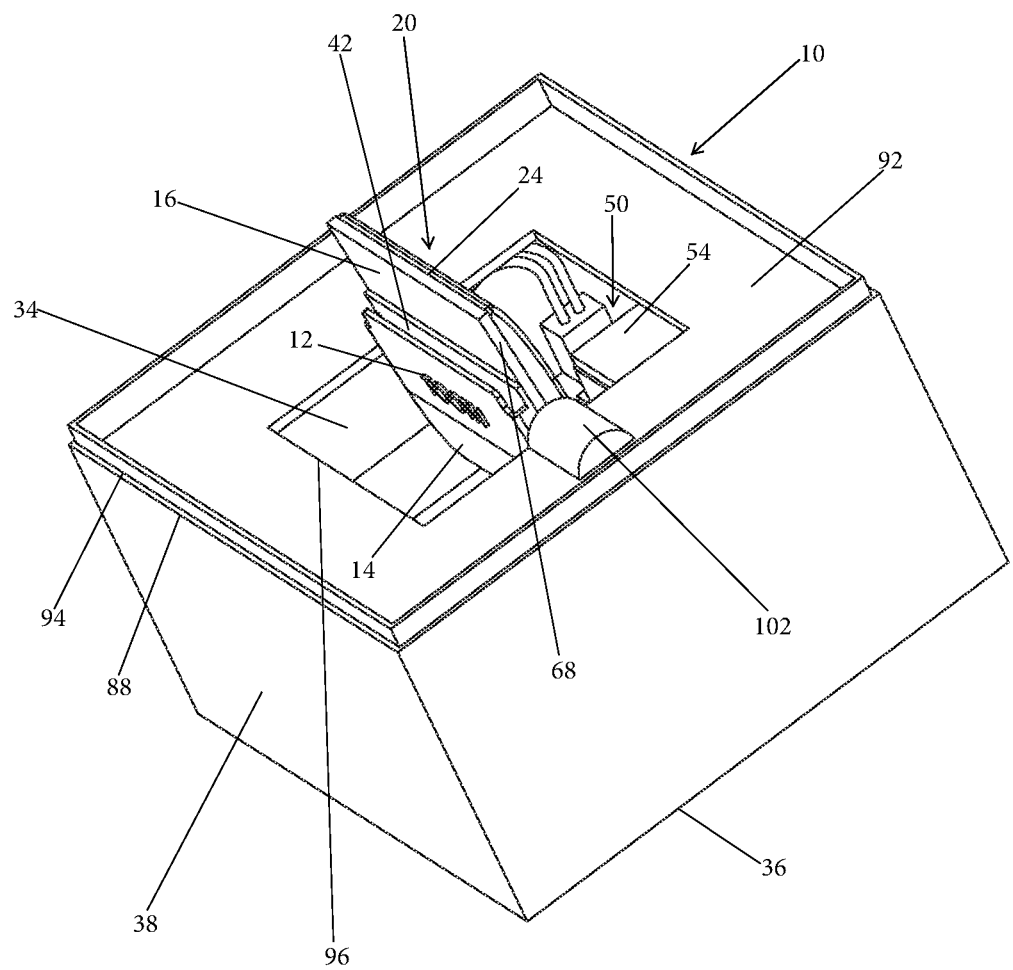
FIG. 4 illustrates an exploded view of the device showing the movement of the rotatable floor.
Figure 5:
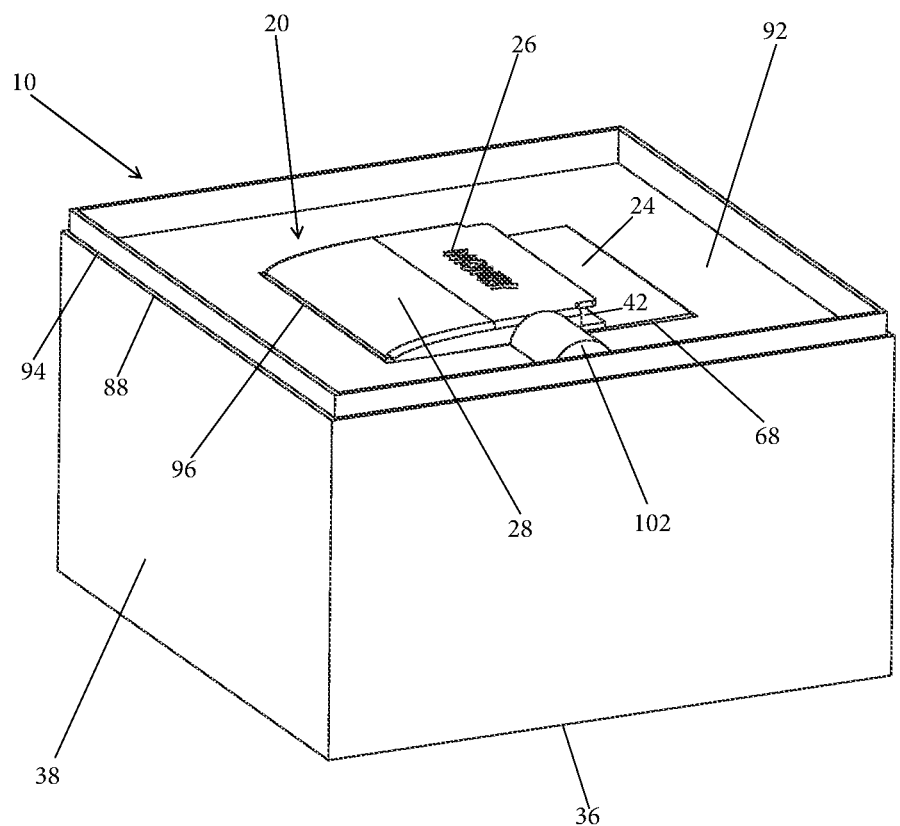
FIG. 5 illustrates an exploded view of the device showing the completed movement of the rotatable floor to a second side.
Figure 6:
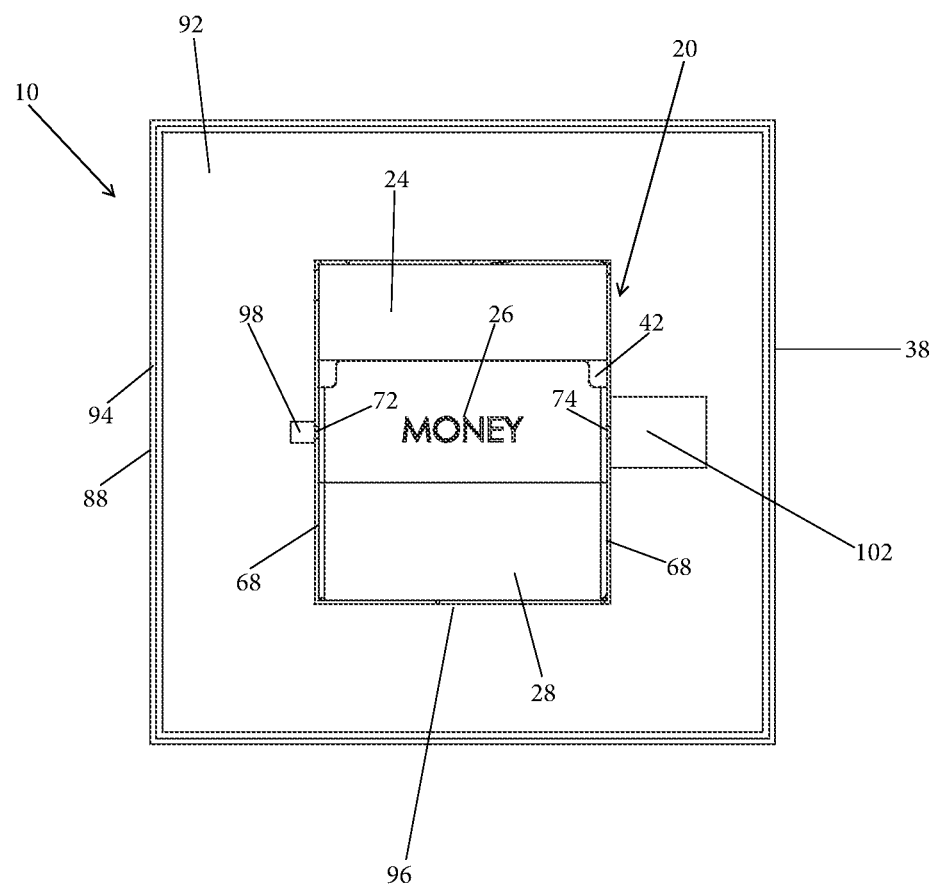
FIG. 6 illustrates a top isometric view of the top wall panel.
Figure 7:
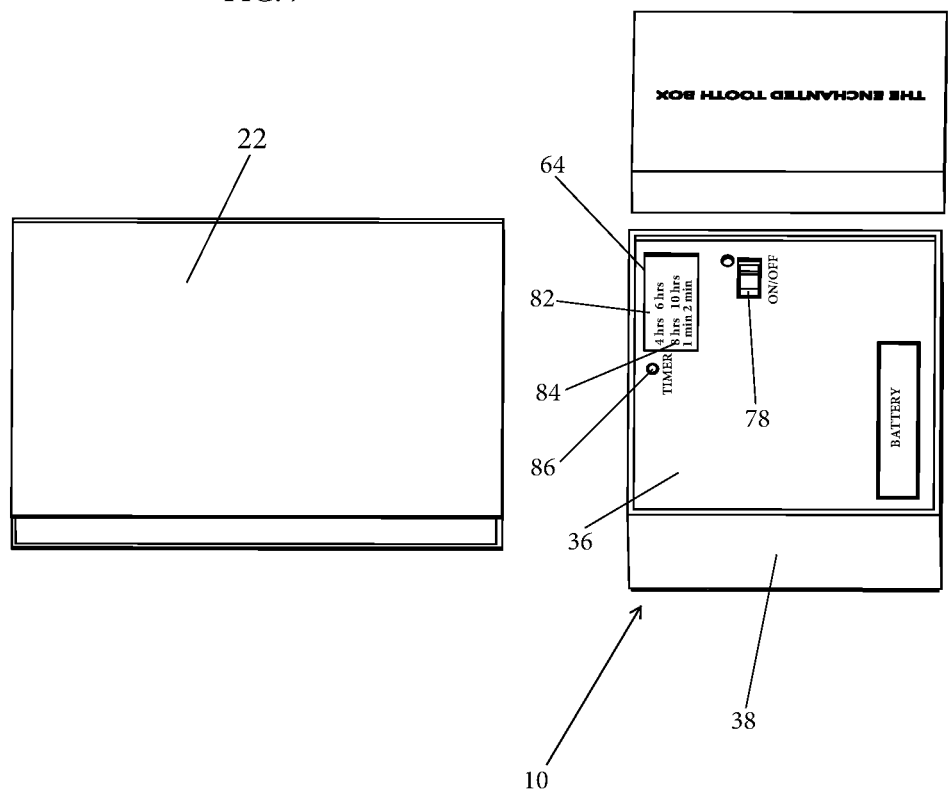
FIG. 7 illustrate an exemplary bottom view of the device with an amusement object to support the illusion of a disappearing object in accordance with the preferred embodiments of the present invention.
Figure 8:
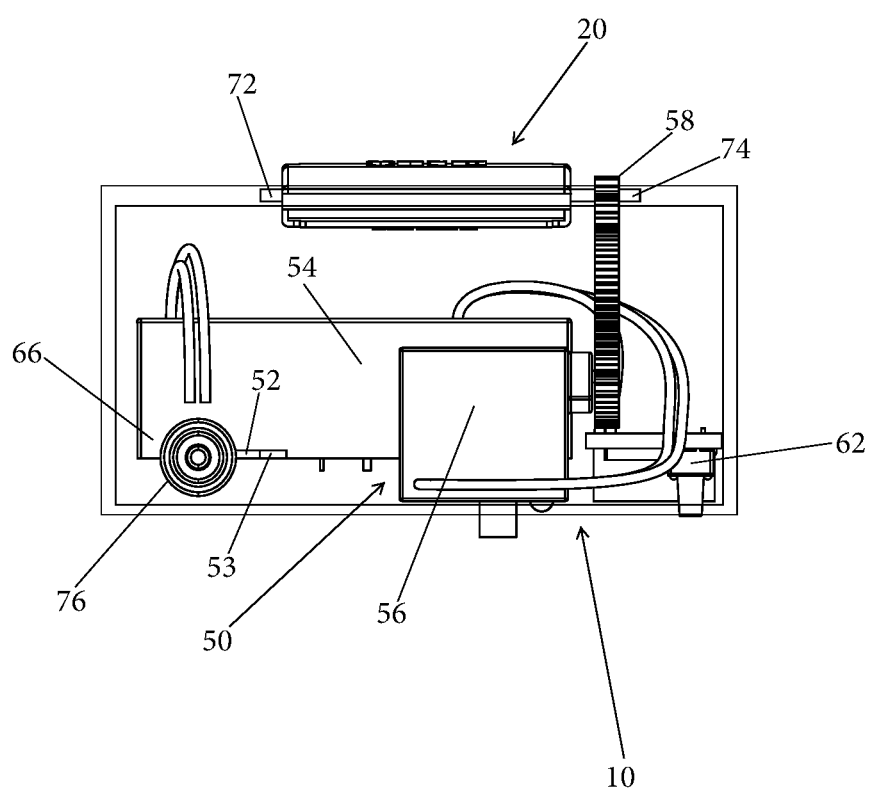
FIG. 8 illustrates a front view of the control unit in accordance with the preferred embodiments of the present invention.
Figure 9:
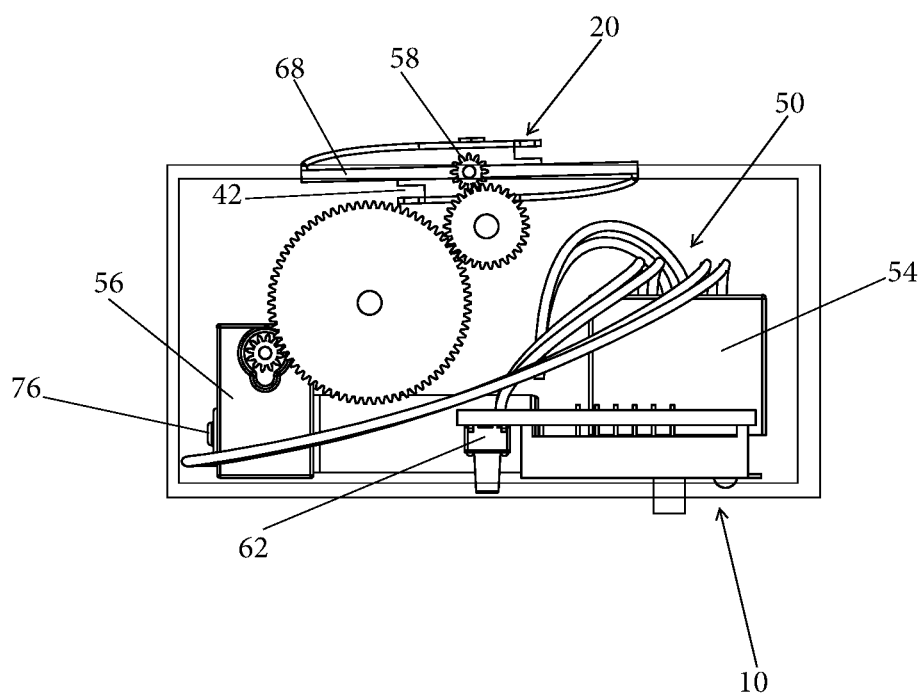
FIG. 9 illustrates a side view of the control unit in accordance with the preferred embodiments of the present invention.
Figure 10:
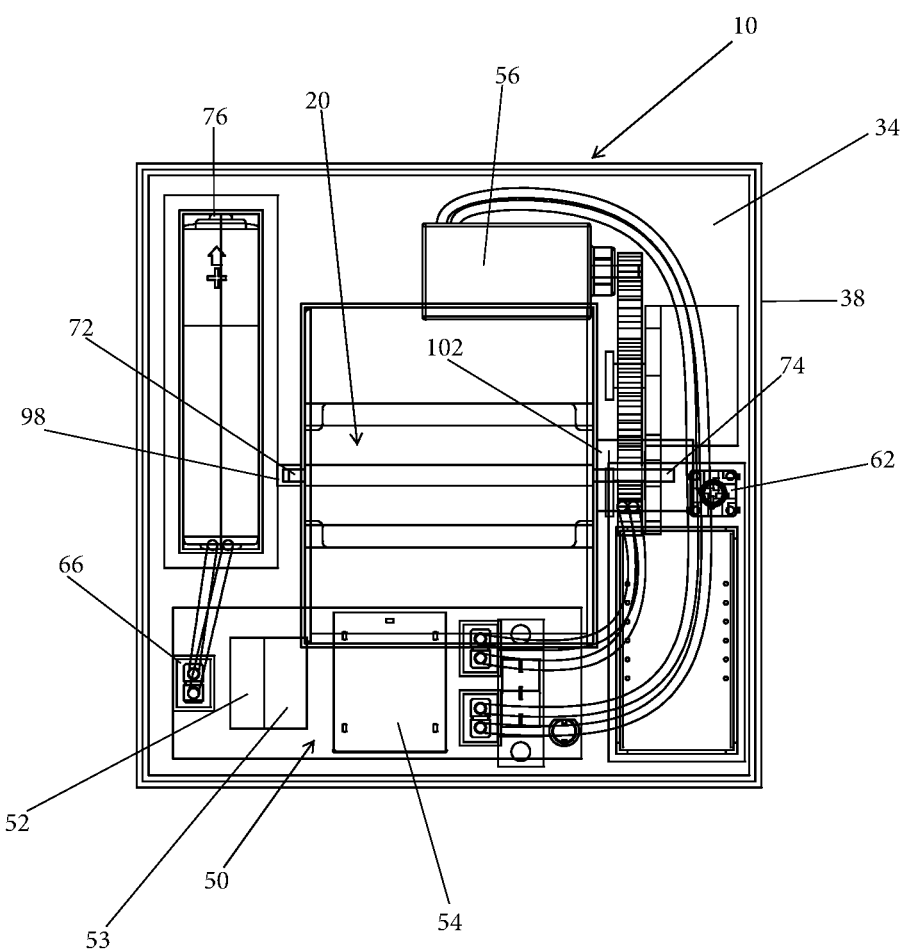
FIG. 10 illustrates a top view isometric drawing of an exemplary device showing the internal elements.
Figure 11:
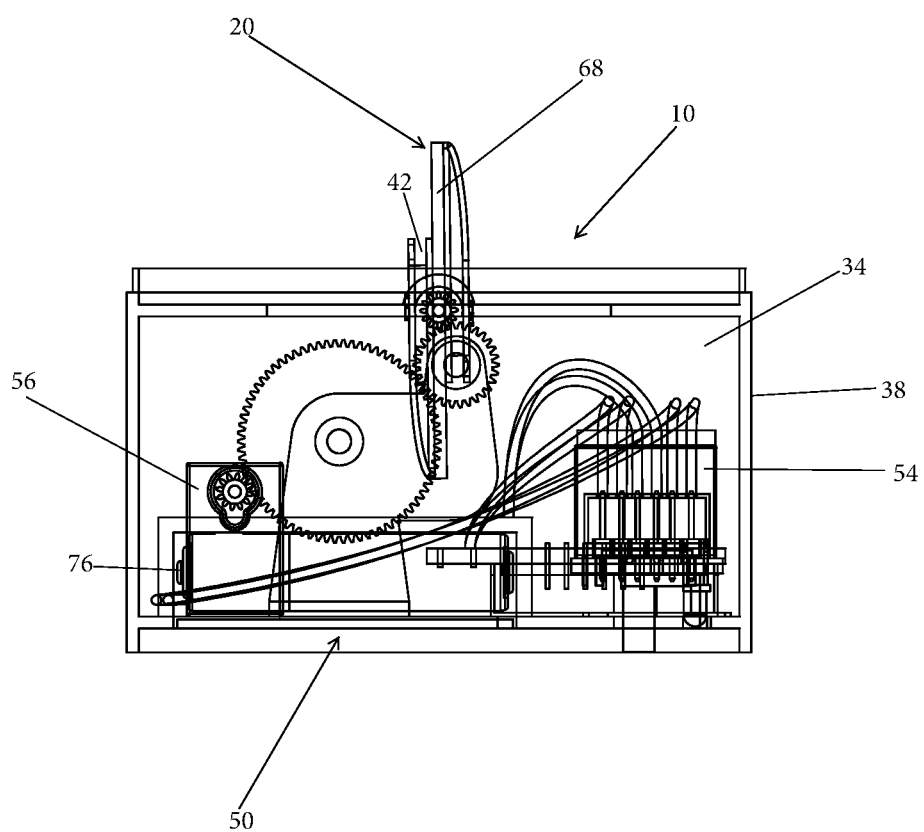
FIG. 11 illustrates a side view isometric drawing of an exemplary device showing the internal elements.
Figure 12:
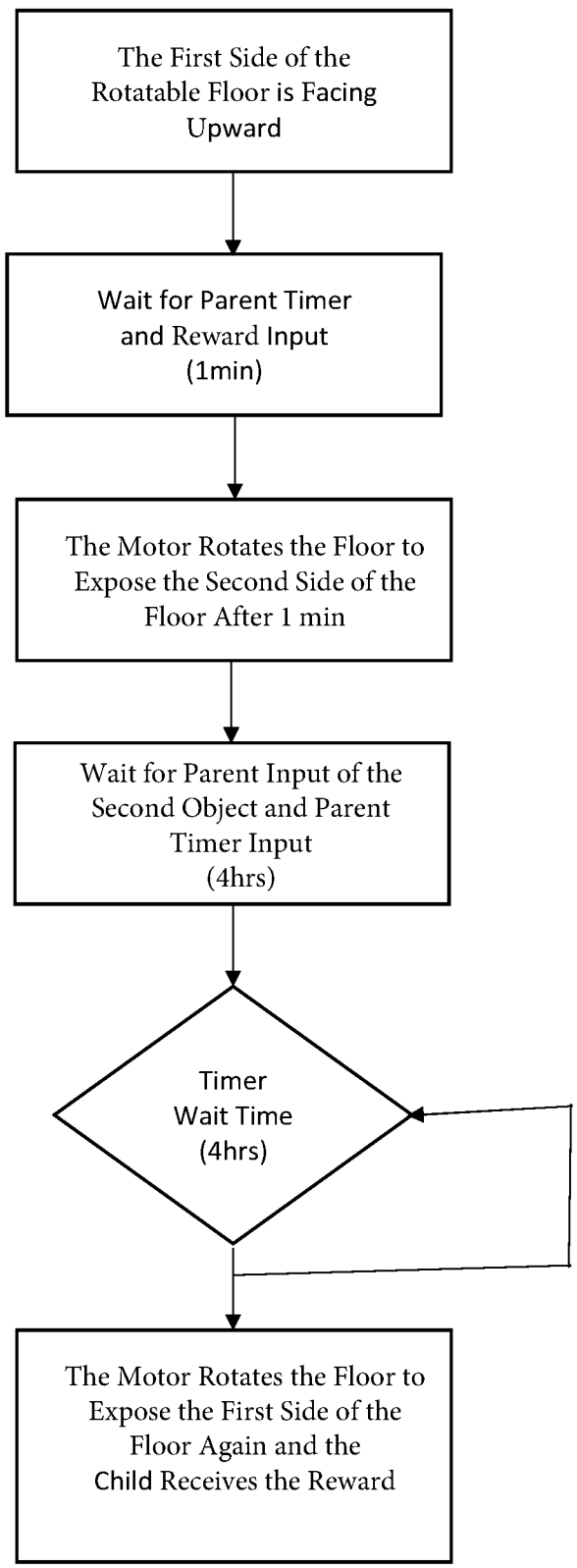
FIG. 12 illustrates a unique method of an embodiment of the system being used by a parent and a child.
Figure 13:
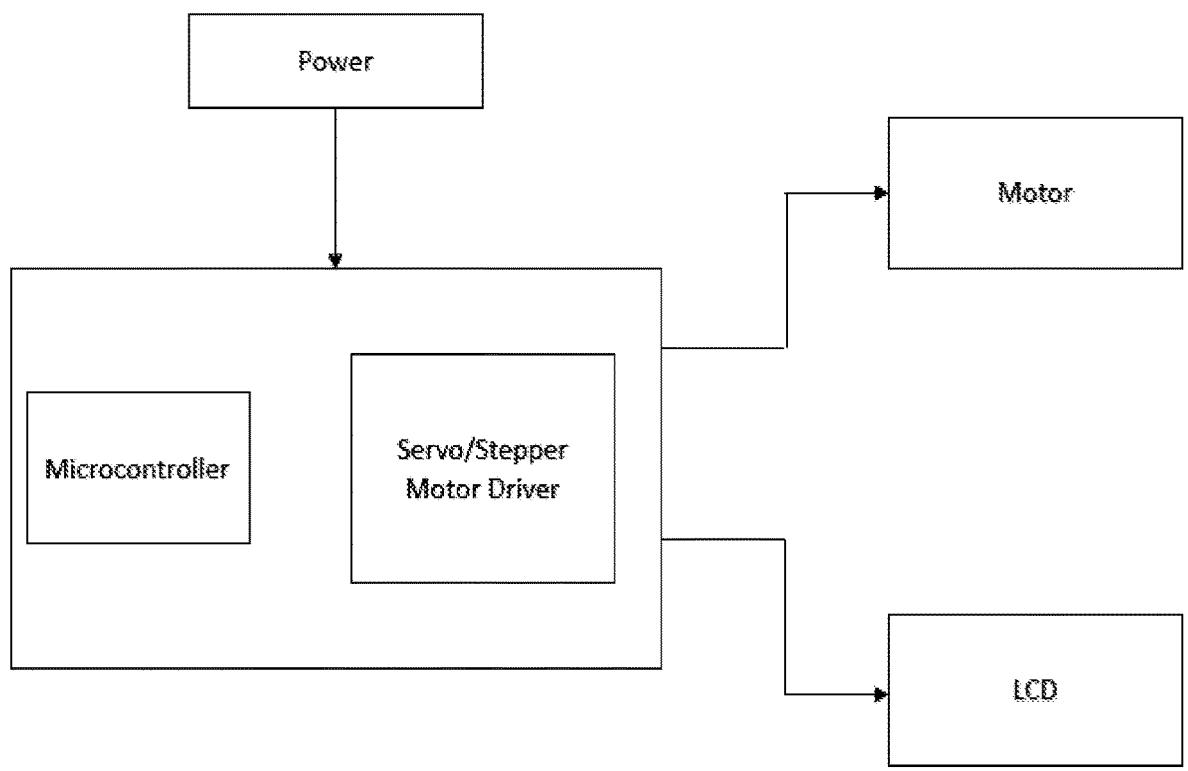
FIG. 13 schematically illustrates the system of the invention as provided herein.

An improved device 10 having a size suitable for hand-held use is disclosed. FIGS. 1-2 illustrate an exemplary device 10 and at least one amusement object 22 for providing the illusion that a first object 12 has disappeared from a first pouch 14 being provided on a first side 16 of a rotatable floor 20. The timed rotation of a rotatable floor 20 to a second side 24 reveals a second object 26 that was hidden in a second pouch 28 and thereby providing the illusion that the first object 12 magically disappeared.

FIGS. 3-7 provide exemplary representations of the device 10 and show the protective lid 32, an interior housing 34, a bottom surface 36, and an exterior housing 38. The first pouch 14 and the second pouch 28 are provided with at least one opening 42 thereon for inserting the first object 12 and the second object 26 respectively.

FIGS. 8-11 show the interior housing 34 accommodating a control unit 50 including a microprocessor 52, a motor driver 54 being controlled in accordance with the microprocessor 52, a stepper motor 56 having a rotatable gear 58 and being in communication with the motor driver 54, a timer mechanism 62 of standard construction and in communication with the microprocessor 52, a display screen 64, and a battery circuit 66 coupled to the control unit 50.

The rotatable floor 20 is of a substantially rectangular configuration and features side walls 68 for coupling with a first attachment post 72, and a second attachment post 74. The second attachment post 74 is rotatably attached to at least one rotatable gear 58 of the stepper motor 56. The battery circuit 66 having at least one battery 76 and an on/off switch being connected thereon for switching the device 10 on/off and the on/off switch 78 being mounted on the bottom surface 36 of said device 10. In a preferred embodiment, the batteries will be inserted in the bottom surface 36 of said device 10 and secured in the battery circuit 66. This construction as provided herein will provide a battery circuit 66 that is hidden from view within the control unit 50 and in some cases the bottom surface 36 being provided as a child-proof cover.

The display screen 64 is mounted on the bottom surface 36 of the device 10 and features a user interface 82 providing timer selection parameters 84 and interactive LED indicator lights 86 that blink during the timer selection process.

Additional features of the device 10 include a microprocessor 52 and a memory device 53 being provided therein. The memory device 53 stores instructions that are adapted to be executed by the processor 52 and one or more custom-programmed software. Databases that are stored in the memory device 53 are configured to be executed by the microprocessor 52. The one or more custom-programmed software and databases provide a first resting stage of the rotatable floor 20 at a 180 degree angle, actuate the motor driver 54, generate and store the timer selection parameters 84. The user interface 82 is in communication with the microprocessor and provides a plurality of timer selection parameters 84. The plurality of timer selection parameters 84 including at least one timer selection parameter 84 being programmed to produce a first 180 degree rotation of the rotatable floor 20 and at least one timer selection parameter being programed to produce a second subsequent 180 degree rotation of the rotatable floor 20 once the motor driver 54 is actuated.

The exterior housing 38 includes a top portion 88 and further comprises a box-like unit of rectangular configuration having a top wall panel 92 being connected thereon. The top wall panel 92 being connected to and extending between the top portion 88 and thereby creating a top ledge 94 bordering the top portion 88. The top ledge 94 securely receives the protective lid 32. The top wall panel 92 further including a midsection opening 96 of substantially rectangular configuration and having a first 98 and a second cavity 102 for receiving the first attachment post 72 and the second attachment post 74 of the rotatable floor 20 and thereby allowing the rotatable floor 20 to move from the first side 16 and the second side 24 within the midsection opening 96 once the motor driver 54.

The first attachment post 72 and the second attachment post 74 being centrally placed on the rotatable floor 20 and said first attachment post 72 and said second attachment post 74 moving said rotatable floor 20 at a 180 degree angle and in such a way that the rotatable floor 20 is pulled inward toward the interior housing 34 when the motor driver 54 is actuated. As may be seen in FIGS. 5-6, said first attachment post 72 and said second attachment post 74 retain said rotatable floor 20 in a parallel disposition to the top wall panel 92 as directed by the microprocessor 52. The first attachment post 72 and the second attachment post 74 being placed in a lock position in such a way that the rotatable floor 20 remains stationary on the first side 16 or the second side 24 once a first rotation is completed.

The protective lid 32 covers the top wall panel 92 when the top wall panel 92 is not in use. The top ledge 94 of the exterior housing 38 is formed so as to receive the protective lid 32 and to retain the protective lid 32 in a closed position over the device 10. The top ledge 94 provides additional resistance to the opening of the protective lid 32.

The top wall panel 92 is connected to the exterior housing 38 wherein the top wall panel 92 is adapted to remain in a position for engaging the rotatable floor 20 within the midsection 96 when said motor driver 54 is actuated.

It will be understood that a plurality of changes can be anticipated in the construction of the device 10 without departing from the spirit of the invention, one such change may be in the use of the device 10 as a magical tooth fairy box by creating the illusion that a tooth that was inserted on the first side 16 of the rotatable floor 20 has magically been replaced by money or a similar item of value. In use, the box will be placed beneath a child's pillow with the expectation that the tooth fairy will visit. In a preferred construction, the amusement object 22 as provided herein can be sold as a book providing stories and illustrations about the tooth fairy. The parent will buy this book along with the device 10 as provided herein when the child has a loose tooth. The child's excitement for the tooth fairy's visit heightens as the parent reads the book and highlights the illustrations that provide reference to the tooth fairy. Unknowingly to the child, the parent will turn on the device 10 and pre-load the device 10 as provided herein by placing a second object 26 in the second pouch 28 that is provided on the second side 24 of the rotatable floor 20. The device 10 as provided herein is ready for use when the parent sets the timer 62 to one minute or a preferred short duration and the first empty pouch 14 is exposed. Unknowingly to the child, the parent can set the timer 62 to the desired time using the user interface 82 that is provided on the bottom surface 36 of the device 10. The LED indicator 86 on the bottom surface 36 of the device 10 provides the additional indication that the timer 62 is set. In a preferred scenario, the device 10 can be placed in close proximity to the child's bed and the rotatable floor 20 rotates 180 degrees as soon as the desired time expires. The rotation therefore reveals the second object 26 that was provided in the second pouch 28. The illusion is a success as the child wakes up and can retrieve the second object 28 without knowing that the tooth remains hidden in the first pouch 14.

Although the desired construction is of a cylinder shaped box of 2 inch diameter by 2 inch length, the device 10 can be constructed in various sizes and can be provided in a standard construction including the provision of durable materials for all elements as provided herein. It can be produced in a standard box-like shape or provided as desired by a user. This can include shapes that are particularly interesting for babies and toddlers and can include round, square, or rectangular shapes. The device 10 can also be constructed in a plurality of colors, textured patterns, embroidery, materials, shapes, textures, prints, and designs to reflect the personal tastes and desires of the manufacturer or users. Logos or designs that are relevant in a particular workplace where such logo or design is necessary for recreational, safety, or health reasons can also be used. In addition, a plurality of decorative elements including trademarks, reflective materials, family heirlooms, and sports memorabilia can be applied and the selective decorative elements can be combined as desired to shape designs of materials typically used to construct the same.

The first pouch 14 and the second pouch 28 are horizontally aligned with the top wall panel 92 and are of identical construction to support the illusion of the appearance of a second object 26. The pouches 14, 28 are formed in a generally rectangular shape that can cover substantially the entire surfaces of the first side 16 and the second side 24 of the rotatable floor 20. Both pouches 14, 28 may be removed or replaced as desired by the user. The fabric being used to construct the pouches 14, 28 can be heavy or lightweight, low porous count, soft, non-irritating, non-woven fabric, or fabric that mimics the construction of a standard pouch of durable construction. The pouches 14, 28 can also be fabricated from a variety of fabric materials that are typically used where an increase in excitement or hand movement are required. The pouches 14, 28 and the provided component parts of the device 10 can be constructed from or covered with additional fabric material selected from a plurality of textile including, satin, yarn varieties, durable plastic material, linen, elastic, nylon, polyester, fibers, long stringy fibrous material, or hemp mixtures. Any of the aforementioned pouch arrangements can be personalized with symbols, personal or business names, logos, photographs, and precious metals that are commonly used to produce jewelry such as durable metals, coral, stones, or other materials such as shells. The precious metals can include rhinestones, silver and copper mixtures, nickel, gold or gold alloys, titanium, platinum, zinc, steel, costume metals, hypoallergenic metals, and stainless steel.

The objects 12, 26 being used to operate the device may be a child's tooth, letters, holiday objects, props, tinkling fairy dust, money, or objects that are temporarily concealed from a child audience to create an illusion. The inside of the device 10 can be provided with materials having noise absorptive properties to reduce the acoustic noise transmission produced from the movement of the internally mounted component parts. The materials can be provided with variable thickness and the layers can include felt or alterative materials such as foam, silicone or rubber.

This invention will be mass produced and can be readily available for use worldwide. Accordingly, an object of the present invention is to provide a rigid structure that is lightweight and easily grasped and controlled by a user. If used as a toy, the unique design allows a child to insert, view and remove objects concealed therein and engage in imaginative play. Also, the unique design allows a user to manipulate the device 10 to locate and remove a desired object without removing any of the component parts. The device 10 will be affordable, reliable, easily manufactured, and relatively inexpensive. It will be made available for households schools, daycares, not-for-profit institutions, and in environments where the prescribed invention is desired.

Having described my invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. An improved device having a size suitable for handheld use and for providing the illusion that a first object has disappeared from a first pouch, said first pouch being provided on a first side of a rotatable floor by the timed rotation of said rotatable floor to a second side of said rotatable floor, said rotatable floor revealing a second object in a second pouch being provided thereon, said device further comprising:
   a) at least one amusement object for use in supporting the illusion that said first object will disappear from said first pouch;
   b) a protective lid, an interior housing, a bottom surface, and an exterior housing;
   c) said first pouch and said second pouch being provided with at least one opening thereon for inserting said first object and said second object respectively;
   d) said interior housing accommodating a control unit including a microprocessor, a motor driver being controlled in accordance with said microprocessor, a stepper motor having a rotatable gear and being in communication with said motor driver, a timer mechanism of standard construction and being in communication with said microprocessor, a display screen, and a battery circuit coupled to said control unit;
   e) said rotatable floor being of substantially rectangular configuration and having side walls for coupling with a first attachment post and a second attachment post, said second attachment post being rotatably attached to said rotatable gear of said stepper motor;
   f) said battery circuit having at least one battery and an on/off switch being connected to said battery circuit for switching on/off said device, said on/off switch being mounted on said bottom surface of said device;
   g) said display screen being mounted on said bottom surface of said device, said display screen having a user interface providing timer selection parameters and a LED indicator providing the timer selection status of said device;
   h) said microprocessor having a memory device coupled to said microprocessor, said microprocessor storing instructions adapted to be executed by said microprocessor;
   i) one or more custom-programmed software and databases, wherein said one or more custom-programmed software and databases are stored in said memory device and are configured to be executed by said microprocessor, the one or more custom-programmed software and databases providing a first resting stage of said rotatable floor at a 180 degree angle, actuating said motor driver, generating and storing said timer selection parameters; said user interface being in communication with said micro processor and providing a plurality of said timer selection parameters; said plurality of timer selection parameters including at least one timer selection parameter being programmed to produce a first 180 degree rotation of said rotatable floor and at least one timer selection parameter being programed to produce a second subsequent 180 degree rotation of said rotatable floor once said motor driver is actuated;
   j) said exterior housing including a top portion and further comprising a box-like unit of rectangular configuration having a top wall panel being connected thereon, said top wall panel being connected to and extending between said top portion thereby creating a top ledge bordering said top portion, said top ledge receiving said protective lid;
   k) said top wall panel further including a midsection opening of substantially rectangular configuration and having a first and a second cavity for receiving said first attachment post and said second attachment post of said rotatable floor and thereby allowing said rotatable floor to move from said first side and second side within said midsection opening once said motor driver is actuated and said second attachment post is actuated by said motor driver,
   l) said first attachment post and said second attachment post being centrally placed on said rotatable floor and said first attachment post and said second attachment post moving said rotatable floor at a 180 degree angle and in such a way that said rotatable floor is pulled inward toward said interior housing when said motor driver is actuated;
   m) said first attachment post and said second attachment post being placed in a lock position in such a way that said rotatable floor remains stationary on said first side or said second once a first rotation is completed.

2. The device of claim 1 wherein said device is constructed in various shapes and sizes.

3. The device of claim 1 wherein said first pouch and said second pouch are horizontally aligned with said top wall panel and are of identical appearance.

4. The device of claim 1 wherein said first pouch and said second pouch are formed in a generally rectangular shape that substantially covers said first side and said second side of said rectangular floor and whereby said first pouch and said second pouch may be removed as desired.

5. The device of claim 1 wherein said top side and said bottom side of said rotatable floor house said first pouch and said second pouch respectively.

6. The device of claim 1 one wherein said protective lid covers said top wall panel when said top wall panel is not in use.

7. The device of claim 1 wherein said top edges of said exterior housing are formed so as to receive said protective lid and to retain said protective lid in a closed position over said device and to provide resistance to the opening of said protective lid.

8. The device of claim 1 wherein said top wall panel is connected with said exterior housing wherein said top wall panel is adapted to remain in a position for engaging said rotatable floor within said midsection opening when said motor driver is actuated.

* * * * *